Patented Mar. 25, 1930

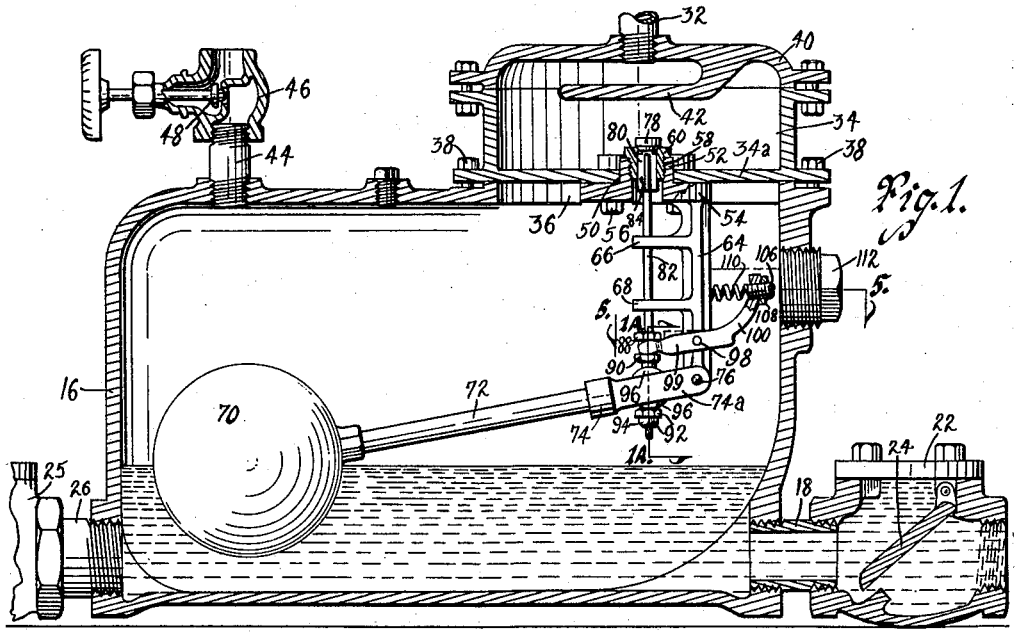
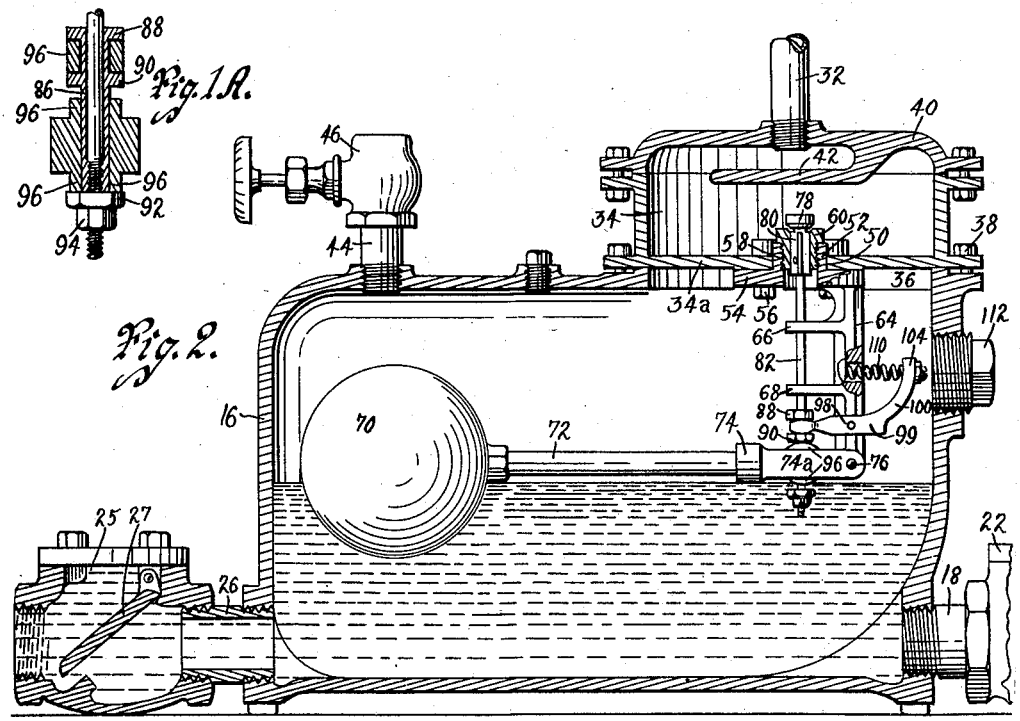

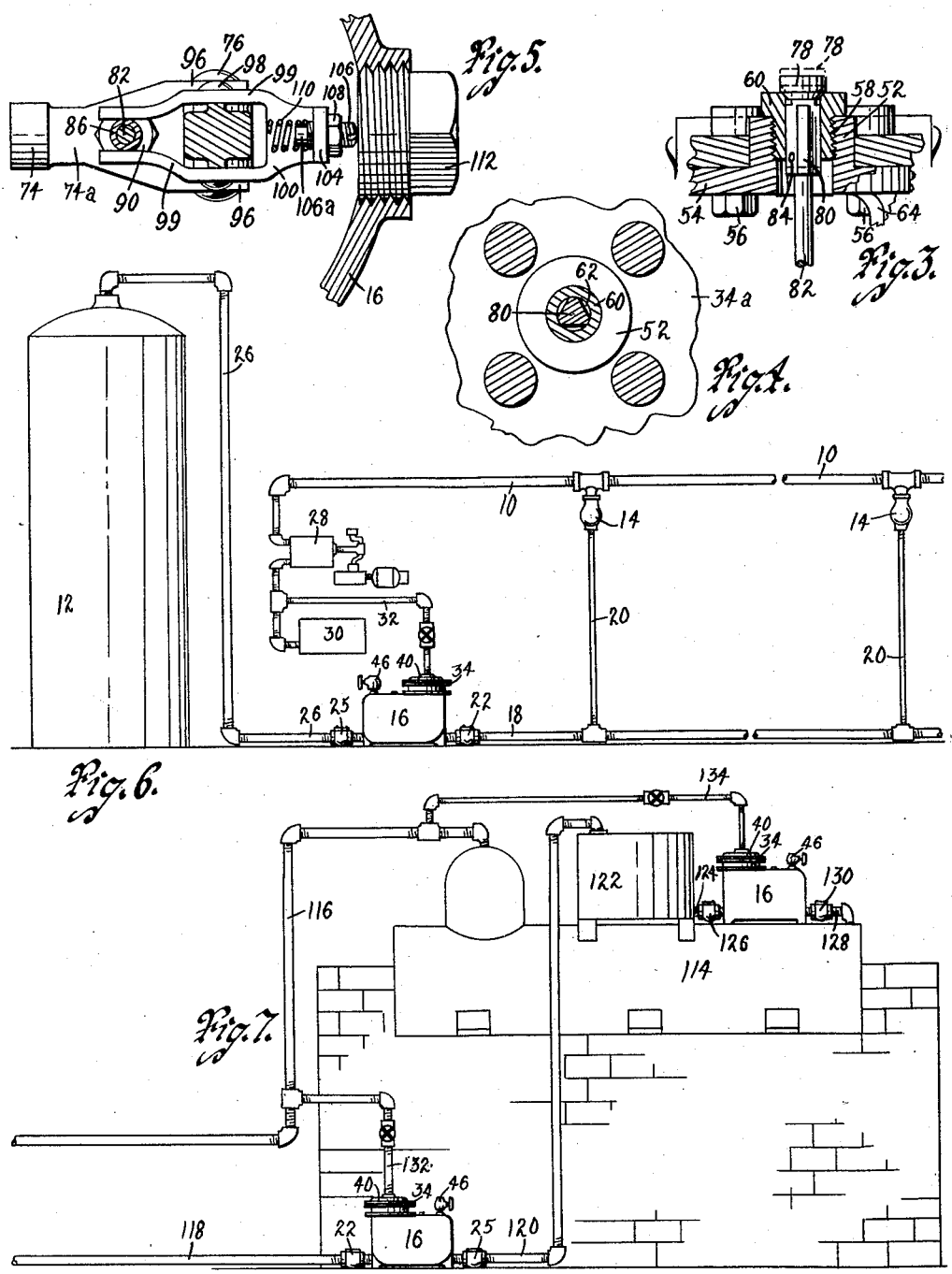

1,751,619

UNITED STATES PATENT OFFICE

LYLE W. BROWNE, OF MARSHALLTOWN, IOWA, ASSIGNOR TO THE FISHER GOVERNOR COMPANY, INC., OF MARSHALLTOWN, IOWA

VACUUM FLUID EXTRACTOR

Application filed May 21, 1927. Serial No. 193,312.

My invention relates to a vacuum fluid extractor of simple and efficient construction, which may be used in fluid conducting lines for taking out liquids of condensation and for delivering such liquids to tanks, boilers or the like.

In this connection, it is my purpose in particular to provide a vacuum fluid extractor of the type embodying a casing, a float controlled valve, and certain novel features of mechanism and arrangement for conveniently accomplishing the purpose.

With these and other objects in view, my invention consists in the construction, arrangement and combination of the various parts of my vacuum fluid extractor, whereby the objects contemplated are attained, as hereinafter more fully set forth, pointed out in my claims, and illustrated in the accompanying drawings, in which:

Figure 1 is a vertical, sectional view of my improved vacuum fluid extractor showing the parts in one position.

Figure 1A is a detail, sectional view taken on the line 1A—1A of Figure 1.

Figure 2 is a similar view illustrating the parts in another position.

Figure 3 is an enlarged, detail, sectional view of the float controlled valve.

Figure 4 is a detail, sectional view taken on the line 4—4 of Figure 3.

Figure 5 is a detail, sectional view taken on the line 5—5 of Figure 1.

Figure 6 is a side elevation illustrating somewhat diagrammatically the installation of my improved vacuum fluid extractor in connection with a fluid conducting line; and Figure 7 is an elevation of a boiler and a portion of a steam line having my improved vacuum fluid extractor installed therein.

For illustrating the construction and manner of use of my improved vacuum fluid extractor, I have shown the extractor installed in connection with a gas pipe line.

Referring to Figure 6, I have used the reference numeral 10 to indicate a gas conducting pipe line, which may for instance be used for conducting gas from a well.

It is assumed for the purpose of illustrating the invention that the gas is drawn through the pipe line 10 by means of a pump by which suction in the pipe is created.

It will be understood that the gas carries a certain amount of vaporized gasoline, some of which condenses in the pipe.

It is desirable to separate this condensed liquid from the gas in the pipe and to conduct it elsewhere as to the storage tank 12.

The pipe line may be provided with low points or drip pockets or catch basins 14 to receive the condensed gasoline.

The problem is to remove the condensed gasoline from the drip pockets 14 and to conduct it to the tank.

I provide a casing 16. The lower part of the casing 16 is connected by a pipe 18 and pipes 20 with the drip pockets 14. In the pipe 18 preferably immediately adjacent to the casing 16 is a suitable valve casing 22 in which is a check valve 24 for preventing return of fluid from the casing 16 to the pipe 18.

Leading also from the lower part of the casing 16 is an outlet pipe 26 arranged to discharge into the storage tank 12. In the pipe 26 is a valve casing 25 in which is a check valve 27 for preventing back flow of fluid from the pipe 26 into the casing 16.

I have shown diagrammatically a pump 28 for creating vacuum in the pipe 10 and pumping the gas therefrom to the gas storage tank 30 also shown in diagram.

The pressure side of the pump is connected by the pipe 32 with the pressure chest 34 at the top of the casing 16. The casing 16 has in its top an opening 36, which is closed by the bottom 34ª of the pressure chest 34, which is secured to the casing 16 by bolts 38 or the like.

The pressure chest 34 has a removable cover 40 into which the pipe 32 is screwed as shown. The cover 40 has supported on its under side a baffle plate 42, which will be hereinafter referred to.

A vent pipe 44 communicates with the upper interior of the casing 16 and with a valve casing 46 in which is mounted an adjustable valve 48 for controlling the vent opening from the casing 16.

Because of the fact that my vacuum fluid extractor is to be used under a great variety of conditions, it is desirable that the float and float controlled valve should be readily and easily removable for purposes of repair or replacement.

For example, it is sometimes desirable to make the float of one material and sometimes of another depending upon whether the device is used in a steam line or a gas line and depending upon the gases to contact with which they must be subjected.

I have therefore provided a convenient structure for the above purposes.

In the bottom member 34ª of the pressure chest 34 is an aperture 50 through which is projected a tubular member 52 having at its lower part an annular flange 54, which is secured to the bottom 34ª by means of a plurality of bolts 56.

The valve structure is illustrated in Figures 1, 2, 3 and 4.

The tubular member 52 has in its upper portion interior screw-threads as indicated at 58 in Figure 3 to receive the removable valve seat 60 through which extends a passage 62.

The interior of the lower sleeve-like portion of the valve seat 60 forms a valve stem guide.

Projecting downwardly from the annular flange 54 on the member 52 is a bracket arm 64, having the vertically spaced laterally projecting fingers 66 and 68. In the casing 16 is a suitable float 70, which when the device is used for handling gasoline may be made of aluminum or very light material.

Connected to the float 70 is a float arm 72. Connected with the float arm 72 is a float arm fitting 74, which has a pair of bifurcated or spaced arms 74ª, which receive between them the lower end of the bracket 64 to which they are pivoted by the float arm connection pin or bolt 76.

Arranged to coact with the valve seat 60 is a valve 78 having a downwardly projecting stem member 80, which is substantially triangular in outline so as to allow passages alongside for fluid flow.

Below the stem member 80 is a valve stem 82 slidably received in the fingers 66 and 68.

The valve stem 82 is loosely projected into a recess in the lower end of the stem member 80 and secured thereto by means of a pin 84 loosely extended through the stem member 82 to allow a little play, whereby the fitting of the valve 78 is insured.

A sleeve 86 is screwed onto the lower end of the stem 82 and has at its upper portion spaced annular flanges 88 and 90.

Screwed onto the lower end of the stem 82 below the sleeve 86 is an adjusting nut 92 below which is a lock nut 94. The arms 74ª receive the stem 82 and sleeve 86 between them, and are provided on their upper and lower surfaces with convex lugs 96.

Pivoted as at 98 on the bracket 64 above the pivot pin or bolt 76 are the arms 99 of a yoke 100. These arms are inclined toward each other at one end and project on opposite sides of the stem 82 and sleeve 86 as shown in Figure 5 between the flanges 88 and 90.

The yoke 100 has at its closed end a flange 104, in which is mounted a set screw 106 on which is a lock nut 108. The set screw 106 has at one end a reduced portion 106ª received in a coil spring 110, which spring bears against the bracket 64 and serves to impart yielding pressure on the yoke 100 for opening the valve and for counteracting the weight of the valve 78. The tension of the spring may be regulated by adjusting the set screw 106 for making the operation of the device as delicate as may be required.

A removable plug 112 is mounted in the wall of the casing 16 opposite the set screw 106 as shown in Figures 1 and 5 for example for allowing convenient access to the set screw 106 for permitting its convenient adjustment.

Before describing the illustrative installation of the vacuum fluid extractor in the return line of a steam heating system, as shown in Figure 7, I will explain briefly the practical operation of the device shown in Figures 1 to 6 inclusive.

It will be assumed that the installation is substantially as shown and the valve 48 is adjusted to allow a limited vent hole from the casing 16.

Assume that the parts are ready for use, it will be noted that the check valves 24 and 27 will be closed and that the casing 16 will be subject on its interior to atmospheric pressure by reason of the vent pipe 44.

When the pump 28 is started for the purpose of drawing gas through the pipe 10, it will impose pressure upon the interior of the pressure chest 34, but no direct draft will be imposed on the valve because of the baffle plate 42.

A vacuum will be created in the pipe 10 for drawing gas therethrough and pumping it to the tank 30.

On account of the vacuum, pressure will be imposed upon the valve 24 for insuring that it will remain closed.

The gasoline or other liquid of condensation will tend to gather in the low spots in the line and, of course, particularly in the drip pockets 14 from which the gasoline will flow by gravity through the pipe 20 to the pipe 18.

As soon as there is a sufficient amount of the gasoline in the pipe 20 to open the valve 24 by its weight, the gasoline will flow into the casing 16.

As the gasoline continues to flow into the casing 16, the float will rise with it.

There is some play between the lugs 96 and the flange 90 on the one side and the adjustable nut 92 on the other side. The degree of this play may be varied by adjusting the nut 92 and the lock nut 94.

When the float 70 is raised by the liquid contents of the casing 16 to the point where it serves to open the valve 78, the liquid contents of the casing 16 will be blown out past the valve 27 into the pipe 26 and to the receiving tank 12.

The valve 24 will prevent the return of any liquid to the pipe 18.

After the gasoline is forced from the casing 16, the float will drop and close the valve 78.

The vent 46 permits the restoration of atmospheric pressure in the casing 16 and thus prevents maintenance of such pressure in the casing as would tend to keep the valve 24 closed. The vent 46 is adjusted so that gas or vapor will escape therethrough at a much slower rate than the rate at which it enters the casing 16 through the valve 60.

The baffle 42 protects the valve 78 from the direct flow of incoming fluid through the pipe 32.

The cycle of operations above explained is repeated as often as condensation liquids accumulate in the casing 16.

I will now describe the installation of one of my vacuum fluid extractors in a steam line.

In Figure 7, I have shown a boiler 114 from which a steam supply line 116 flows to the heating radiators of a building. The return line for water of condensation is shown at 118.

It is well known that in ordinary heating plants, the water of condensation is taken from the radiators by steam traps not herein further referred to and permitted to flow through a return line.

Assuming that by reason of structural features in the building, the return line must be lower than the boiler, it will be understood that it then becomes necessary to get the return water of condensation from the return line into the boiler. Heretofore this has been ordinarily done by providing a pumping system.

The desirable result can be obtained by installing two of our automatic vacuum fluid extractors in the manner herein explained.

The return line 118 is connected to the lower part of the casing 16 in the same manner as has already been explained for the pipe 18 (see Figures 1 and 6). The pipe 118 has the usual check valve structure 22 referred to in describing the installation already explained.

Leading from the lower part of the casing 16 shown in Figure 7 is an outlet pipe 120 in which is a check valve structure 25 similar to that already described.

The pipe 120 leads upwardly and discharges into a tank 122. The lower part of the tank 122 is connected by means of a pipe 124 in which is a check valve 126 with another casing 16, which discharges through the pipe 128, having a check valve 130, into the boiler 114.

The pressure chest of the lower casing 16 shown in Figure 7 is connected by a pipe 132 with the boiler, so as to be subjected to boiler pressure. Similarly, the pressure chest of the upper casing 16 is connected by the pipe 134 with boiler pressure.

In the operation of the installation shown in Figure 7, the return condensation water flows through the pipe 118 into the lower casing 16. When the float is raised in the lower casing 16 to a height sufficient for opening the valve 60 therein, the pressure supplied through the pipe 132 forces the liquid contents of the lower casing 16 through the pipe 120 to the tank 122.

When the water has been forced out of the lower casing 16 until the float drops to valve closing position, the weight of the water in the pipe 120 will hold the check valve 25 closed, and the cycle of operations may be repeated.

The water supplied to the tank 122 through the pipe 120 will flow through the pipe 124 to the upper casing 16 until the float therein is raised to valve opening position, whereupon the pressure supplied through the pipe 134 will be imparted to the upper interior of the upper casing 16.

This will simply balance the back pressure through the pipe 128, and since the upper casing 16 is above the boiler, the water return will flow by gravity into the boiler.

If the return line can be arranged so that it will flow directly into the tank 122, it will readily be seen that the upper casing 16 can be used in the installation shown for returning the condensation water to the boiler without the necessity for using the lower casing 16.

The advantage of using a fluid extractor of the kind here described in an installation such as that shown in Figure 7 will be obvious.

The return of the condensation water is automatic and is accomplished by utilizing boiler pressure without the necessity for a pump, which is expensive and requires constant repairs, especially where it is used for handling hot water.

From the foregoing, it is seen that my improved fluid extractor may be used in a great variety of installations and may be adapted to a great variety of conditions that arise in different fields of use.

It will be understood that the float 70 used in a steam line, such as that illustrated, may be of copper, whereas in the handling of gasoline, it should be of lighter material.

The valve and valve seat are readily removable and replaceable. This makes it possible to use different metals for different installations where the problem of erosion due to acid or the like arises.

A particular feature of my present structure which adds value to the device in that it makes it possible to replace working parts easily and cheaply is found in the construction of the member 52 with the flange or plate 64 and the bracket supported thereon, the whole being readily and quickly detachable from the bottom 34ª of the pressure chest.

The parts that are likely to become worn or eaten by acid or otherwise rendered unusable are easily replaced in a structure such as that herein explained.

It is of course my purpose to cover by the patent to be issued upon my application any modifications in structure and any use of different materials or mechanical equivalents, which may be reasonably included within the scope of my claims.

I claim as my invention:

1. In a device of the class described, a casing having in its lower part inlet and outlet passages, a pressure chest on said casing and separated therefrom by a partition member, an opening through said partition member, a tubular flanged member extending through said partition having the flange thereof bolted to said partition member, said tubular flanged member having a bracket projected into the casing and having a valve seat in the pressure chest, a valve for cooperating with said seat having a valve stem slidably supported by the bracket, and a float having an arm pivoted to said bracket and operatively connected to said valve stem.

2. In a device of the class described, a casing having in its lower part inlet and outlet passages, a pressure chest, a bracket projected into the casing and having a valve seat in the pressure chest, a valve for cooperating with said seat having a stem slidably supported on the bracket, a sleeve threaded on said stem having a flange on one end, a flange nut on said stem at the other end of said sleeve and a float having an arm pivoted to said bracket and extending past said stem between said flange on said sleeve and said flange nut, said sleeve being adjustable longitudinally relative to said stem.

3. In a device of the class described, a casing having in its lower part inlet and outlet passages, a pressure chest on said casing a bracket projected into the casing and having a valve seat in the pressure chest, a valve for cooperating with said seat having a stem slidably supported on the bracket for vertical movement, a float having an arm pivoted to said bracket and operatively connected to said stem, a bell crank shaped yoke device pivoted between its ends on said bracket having one end operatively connected with the stem, and means for imparting yielding pressure continuously in one direction on the other end said pressure being applied in a substantially horizontal direction.

4. In a device of the class described, a casing having in its lower part inlet and outlet passages, a pressure chest on said casing and separated therefrom by a partition member, a tubular member mounted in said partition having a bracket projected into the casing and having a valve seat in the pressure chest, a valve for cooperating with said seat having a stem slidably supported on the bracket, a float having an arm pivoted to said bracket and operatively connected to said valve, a yoke device pivoted between its ends on said bracket having one end operatively connected with the stem, means for imparting yielding pressure on the other end, and means for regulating said last means.

5. In a device of the class described, a valve structure comprising a valve seat, a bracket projecting therefrom, a valve for coacting with said seat having a stem slidably supported on said bracket, a yoke pivoted to said bracket and having an operative connection at one end with said stem, a spring interposed between the bracket and the other end of the yoke, and an adjusting nut carried by said yoke for regulating the tension of said spring.

6. In a device of the class described, a casing, a pressure chest thereon, and a valve structure for controlling flow between the pressure chest and the casing comprising a removable tubular member, a valve seat detachably mounted therein, a bracket on said member, said valve having a stem slidably mounted in said bracket, a float arm pivoted to said bracket and having a lost motion connection with said stem, and means for continuously and yieldingly tending to open the valve.

7. In a device of the class described, a casing, a pressure chest thereon, and a valve structure for controlling flow between the pressure chest and the casing comprising a removable tubular member, a valve seat detachably mounted therein, a bracket on said member, said valve having a stem slidably mounted in said bracket, a float arm pivoted to said bracket and having a lost motion connection with said stem, means for yieldingly tending to open the valve, said means comprising a yoke pivotally supported on the bracket and having an operative connection with the stem, and a spring for exerting yielding pressure in one direction on the yoke, an adjusting nut carried by the yoke for regulating the tension of the spring and a removable plug in said casing for allowing access to the adjusting nut.

Des Moines, Iowa, April 6, 1927.

LYLE W. BROWNE.